(12) United States Patent
Subramanian et al.

(10) Patent No.: US 7,223,465 B2
(45) Date of Patent: May 29, 2007

(54) SIC/SIC COMPOSITES INCORPORATING UNCOATED FIBERS TO IMPROVE INTERLAMINAR STRENGTH

(75) Inventors: Suresh Subramanian, Mason, OH (US); James Dale Steibel, Mason, OH (US); Douglas Melton Carper, Trenton, OH (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 11/025,510

(22) Filed: Dec. 29, 2004

(65) Prior Publication Data

US 2006/0141257 A1    Jun. 29, 2006

(51) Int. Cl.
  *B32B 17/12*   (2006.01)
  *B32B 15/04*   (2006.01)
  *B32B 11/00*   (2006.01)
  *C04B 35/00*   (2006.01)

(52) U.S. Cl. .............. 428/293.4; 428/293.7; 428/294.4; 442/178; 501/95.2

(58) Field of Classification Search ......... 501/95.2; 428/293.4, 293.7, 294.4; 442/178, 368
See application file for complete search history.

(56) References Cited

U.S. PATENT DOCUMENTS

| | | | |
|---|---|---|---|
| 3,565,683 A | 2/1971 | Morelock | |
| 4,642,271 A | 2/1987 | Rice | |
| 4,766,013 A | 8/1988 | Warren | |
| 5,015,540 A * | 5/1991 | Borom et al. ............... | 428/698 |
| 5,079,039 A | 1/1992 | Heraud et al. | |
| 5,330,854 A * | 7/1994 | Singh et al. ................ | 428/698 |
| 5,407,740 A | 4/1995 | Jessen | |
| 5,455,106 A | 10/1995 | Steffier | |
| 5,866,244 A | 2/1999 | Jessen | |
| 5,952,100 A | 9/1999 | Corman et al. | |
| 5,962,103 A | 10/1999 | Luthra et al. | |
| 6,277,440 B1 | 8/2001 | Reynolds | |
| 6,280,550 B1 * | 8/2001 | Steibel et al. ............... | 156/182 |
| 6,284,357 B1 | 9/2001 | Lackey et al. | |
| 6,350,713 B1 * | 2/2002 | Petrak ....................... | 501/95.2 |
| 6,986,940 B1 * | 1/2006 | Carper ...................... | 428/292.1 |
| 2002/0058107 A1 | 5/2002 | Fareed et al. | |
| 2002/0079623 A1 | 6/2002 | Petrak | |

FOREIGN PATENT DOCUMENTS

| | | |
|---|---|---|
| EP | 0467686 A2 | 1/1992 |
| EP | 0781737 A1 | 7/1997 |
| EP | 0798281 A2 | 10/1997 |
| EP | 1013626 A2 | 6/2000 |
| WO | WO 93/20018 | 10/1993 |

\* cited by examiner

*Primary Examiner*—N. Edwards
(74) *Attorney, Agent, or Firm*—McNees Wallace & Nurick LLC

(57) ABSTRACT

The present invention is a ceramic matrix composite turbine engine component, wherein the component has a region of expected higher interlaminate stress during normal engine operation. The component includes both coated fiber tows and uncoated fiber tows arranged together into a preselected form, wherein the uncoated fiber tows are located at predetermined regions of expected high interlaminate stress. The invention further includes method of manufacturing a CMC such as a composite turbine engine component, wherein the component has a region of expected higher interlaminate stress during engine operation.

12 Claims, 4 Drawing Sheets

SIC/SIC COMPOSITES INCORPORATING UNCOATED FIBERS TO IMPROVE INTERLAMINAR STRENGTH

This invention was made with government support under Contract No. N00421-00-3-0536. The government may have certain rights to the invention.

FIELD OF THE INVENTION

The present invention relates generally to ceramic matrix turbine engine components, and more particularly, to a heterogeneous material system with intermittent regions of coated and uncoated fibers in a ceramic matrix composite.

BACKGROUND OF THE INVENTION

In order to increase the efficiency and the performance of gas turbine engines so as to provide increased thrust-to-weight ratios, lower emissions and improved specific fuel consumption, engine turbines are tasked to operate at higher temperatures. As the higher temperatures reach and surpass the limits of the material comprising the components in the hot section of the engine and in particular the turbine section of the engine, new materials must be developed.

As the engine operating temperatures have increased, new methods of cooling the high temperature alloys comprising the combustors and the turbine airfoils have been developed. For example, ceramic thermal barrier coatings ("TBC") were applied to the surfaces of components in the stream of the hot effluent gases of combustion to reduce the heat transfer rate and to provide thermal protection to the underlying metal and allow the component to withstand higher temperatures. These improvements helped to reduce the peak temperatures and thermal gradients. Cooling holes were also introduced to provide film cooling to improve thermal capability or protection. Simultaneously, ceramic matrix composites were developed as substitutes for the high temperature alloys. The ceramic matrix composites ("CMC") in many cases provided an improved temperature and density advantage over the metals, making them the material of choice when higher operating temperatures were desired.

A number of techniques have been used in the past to manufacture turbine engine components, such as turbine blades, using ceramic matrix composites. However, such turbine components, under normal operating conditions, experience varying degrees of local stresses. In the dovetail section of turbine blade components, relatively higher tensile stress regions are located in the outermost portion of the dovetail section. Ideally, the CMC component would be designed such that the component was stronger in the region of the local stresses. One method of manufacturing CMC components, set forth in U.S. Pat. Nos. 5,015,540; 5,330,854; and 5,336,350; incorporated herein by reference and assigned to the assignee of the present invention, relates to the production of silicon carbide matrix composites containing fibrous material that is infiltrated with molten silicon, herein referred to as the Silcomp process. The fibers generally have diameters of about 140 micrometers or greater, which prevents intricate, complex shapes, such as turbine blade components, to be manufactured by the Silcomp process.

Another technique of manufacturing CMC turbine blades is the method known as the slurry cast melt infiltration ("MI") process. A technical description of such a slurry cast MI method is described in detail in U.S. Pat. No. 6,280,550 B1, which is assigned to the Assignee of the present invention and which is incorporated herein by reference. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. By "silicon carbide-containing fiber" is meant a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide. These examples are given for demonstration of the term "silicon carbide-containing fiber" and are not limited to this specific combination. Other fiber compositions are contemplated, so long as they include silicon carbide.

A major challenge in this approach is fiber coatings. Typically, fibers are coated with a boron nitride ("BN") layer, prior to densifying the component with a conventional process such as slurry casting and silicon melt infiltration, to improve the toughness of the material. The resulting material, while providing a desirable toughness, will have inherently low interlaminar strength properties. In many of the hot section applications such as combustion liners, high-pressure turbine ("HPT") vanes, low pressure turbine ("LPT") blades, and shrouds, the thermal gradients and mechanical loads result in significant local interlaminar stresses. As a result of the low interlaminar strength, cracks can propagate through the material.

What is needed is a method of manufacturing CMC turbine engine components that takes advantage of properties associated with coated and uncoated fibers.

SUMMARY OF THE INVENTION

Improvements in manufacturing technology and materials are the keys to increased performance and reduced costs for many articles. As an example, continuing and often interrelated improvements in processes and materials have resulted in major increases in the performance of aircraft gas turbine engines, such as the improvements of the present invention. The present invention is a novel method for manufacturing a turbine engine component made from a ceramic matrix composite (CMC) using both coated and uncoated ceramic fibers. The present invention produces a component that has higher interlaminar strength within discrete higher interlaminar stress regions within the component during normal engine operation, thereby improving the functionality of the component.

The present invention provides a ceramic matrix composite turbine engine component, the component having a region of higher interlaminar stress during engine operation, that includes a plurality of unidirectional ceramic fiber tows, a coating applied to a portion of the unidirectional ceramic fiber tows, and a ceramic matrix material lying in interstitial regions between the tows.

The present invention also provides a method of manufacturing a turbine engine component, the component having a region of expected higher interlaminar stress during engine operation, that includes providing a plurality of uncoated ceramic fiber tows, applying a coating to a preselected portion of the fiber tows to form a plurality of coated fiber tows while leaving a preselected portion of the fiber tows uncoated. The step of applying a coating includes using chemical vapor deposition. The method further includes laying up the plurality of fiber tows in a preselected arrangement to form a component preform, wherein uncoated fiber tows are positioned in the region of expected higher interlaminar stress, followed by partially densifying the component preform using carbon-containing slurry. Lastly, the method includes further densifying the component preform with at least silicon to form a ceramic matrix composite aircraft engine component with biased architecture.

The present invention further provides a method of manufacturing a hybrid preform, that includes providing a plurality of uncoated ceramic fiber tows, coating a preselected portion of the fiber tows using chemical vapor deposition to form a plurality of coated fiber tows while leaving a preselected portion of the fiber tows uncoated; wherein the coating includes using chemical vapor deposition, followed by weaving or laying up the coated fiber tows with the uncoated fiber tows to form a plurality of hybrid cloths or lay-ups, and laying up the plurality of hybrid cloths or lay-ups in a preselected arrangement to form a desired shape.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The present invention relates to composite articles for gas turbine engine components, and methods of producing such articles. This patent application incorporates by reference commonly owned U.S. Pat. No. 5,952,100, U.S. patent application Ser. No. 10/784,734 filed on Feb. 23, 2004, and U.S. patent application Ser. No. 10/952,193 filed Sep. 28, 2004, as though fully set forth herein.

Figure 1:
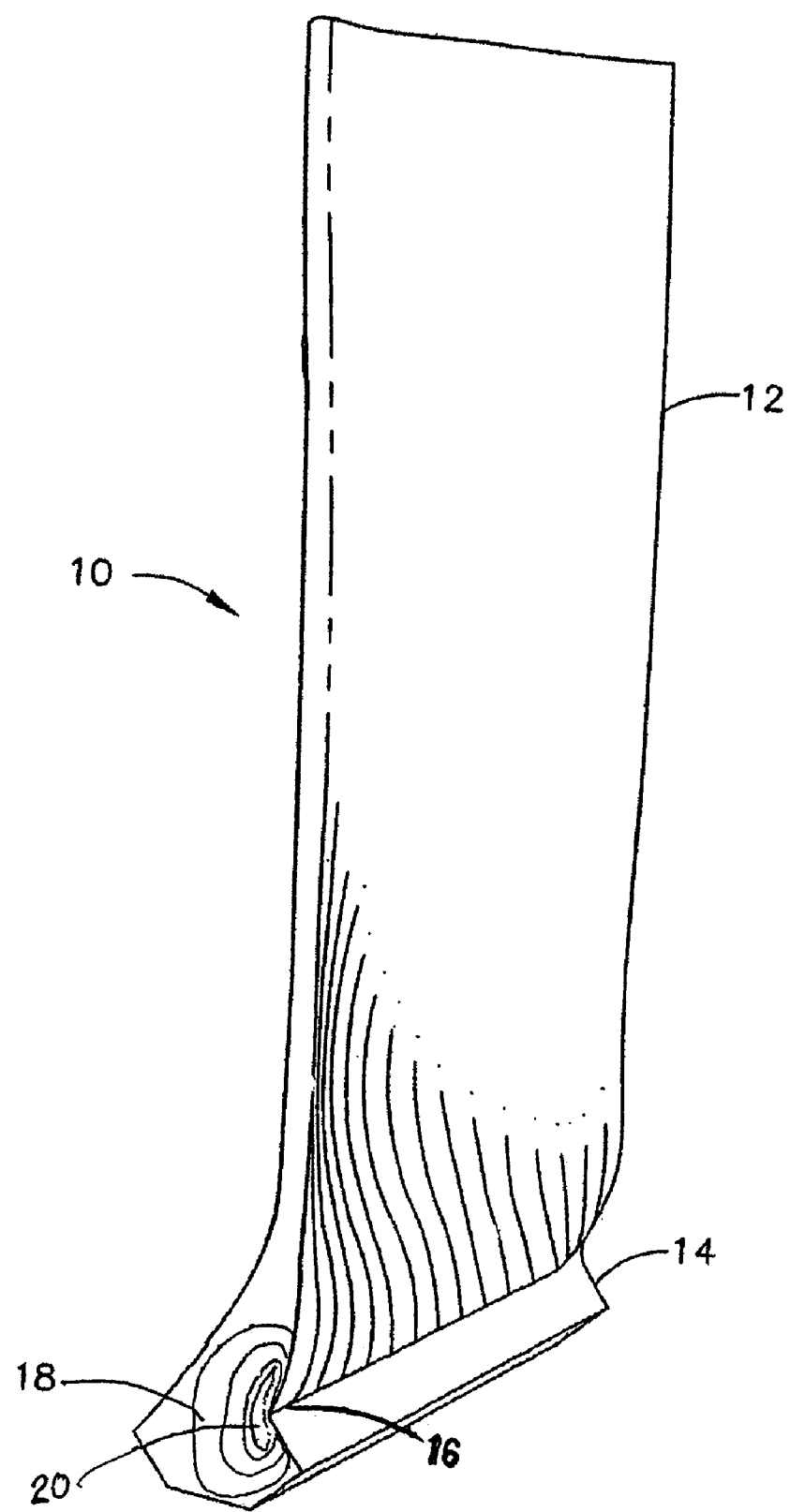
FIG. 1 is a side perspective view of an exemplary LPT blade in an aircraft engine.

FIG. 1 depicts an exemplary aircraft engine LPT blade 10. In this illustration a turbine blade 10 comprises a ceramic matrix composite material. The turbine blade 10 includes an airfoil 12 against which the flow of hot exhaust gas is directed. The turbine blade 10 is mounted to a turbine disk (not shown) by a dovetail 14 that extends downwardly from the airfoil 12 and engages a slot (not shown) of similar geometry on a turbine disk. Dovetail 14 includes a fillet radius 16 defined along a line where surfaces of airfoil 12 and dovetail 14 form a concave intersection. FIG. 1 also illustrates differing regions of interlaminar stress experienced by blade 10 in a simulated operating environment. A lower stress region 18 is illustrated near the center of dovetail 14, while a higher stress region 20 is illustrated near fillet radius 16. As can be expected, interlaminar stress may be higher in regions adjacent a surface transition, such as fillet radius 16. In other dovetail shapes, regions of higher interlaminar stress 20 are found in the center portion of the dovetail. As illustrated, stress regions 18, 20 extend through blade 10 along the length of fillet radius 16.

Figure 2:
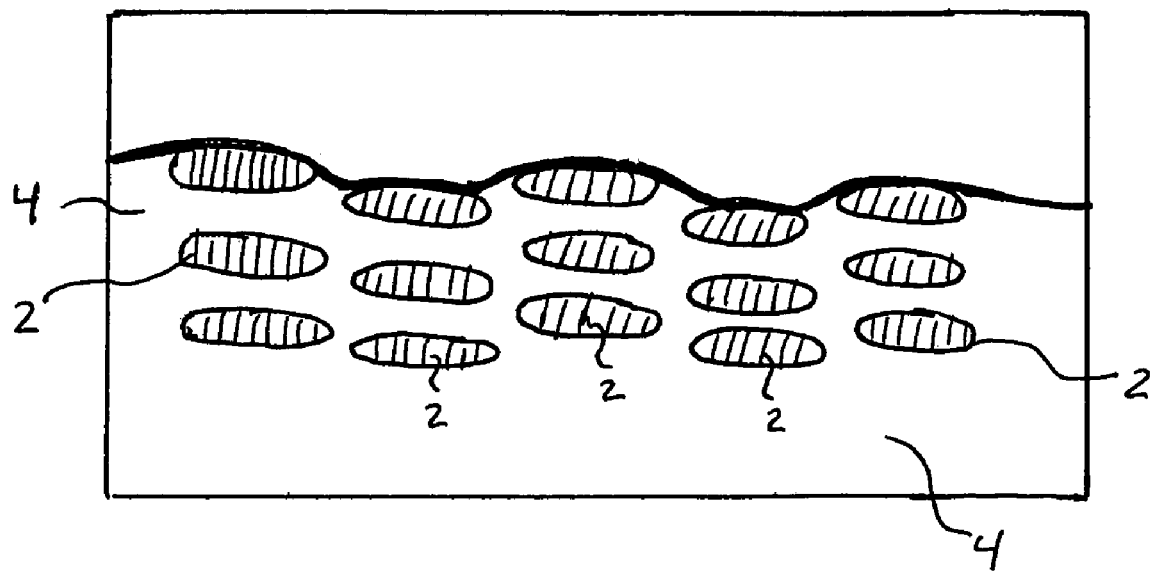
FIG. 2 is a cross-sectional view of a prior art CMC aircraft engine component having uniformly coated fiber tows illustrating exemplary crack propagation resulting from interlaminar stress caused by engine operation.

Referring now to FIG. 2, a cross sectional view of a prior art CMC aircraft engine component, such as a blade 10, is shown. The prior art CMC component utilizes uniformly coated fiber tows 2 that are coated with a composition including Boron Nitride (BN). As further described herein, the presence of BN improves composite fracture toughness, but also results in a weak bond interface between the coated fiber tows 2 and the interstitial ceramic matrix 4. This weak bond can result in separation of the fiber 2 from the matrix 4, causing unattenuated interlaminar cracking of the component in regions of high interlaminar stress 20.

Figure 3:
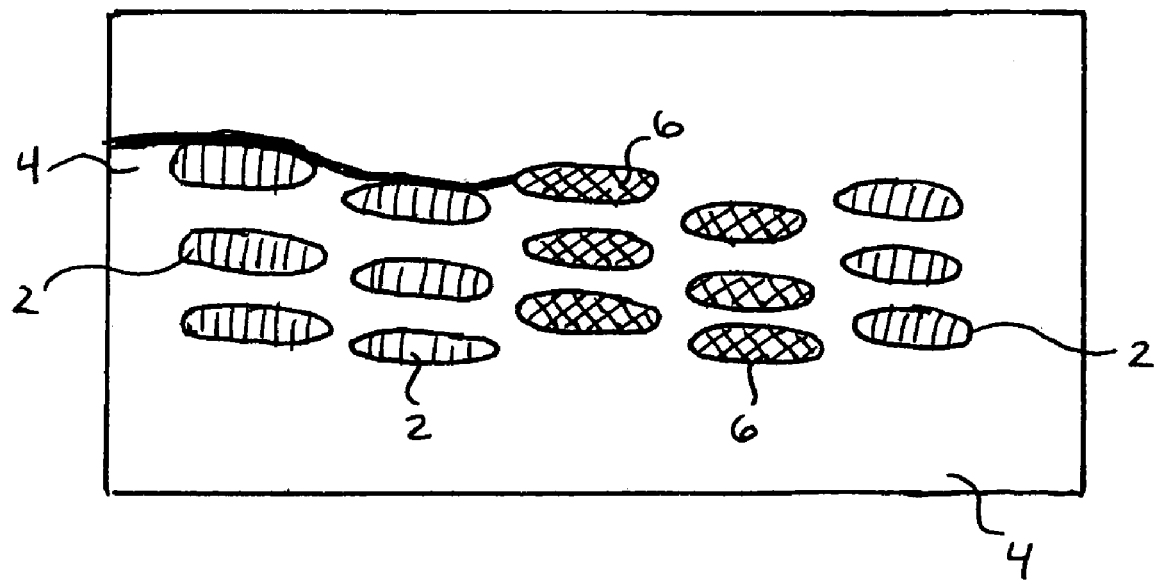
FIG. 3 is a cross-sectional view of the CMC aircraft engine component of the present invention having coated fiber tows intermingled with uncoated fiber tows illustrating exemplary crack propagation resulting from interlaminar stress resulting from engine operation in accordance with the present invention.

Referring now to FIG. 3, a cross-sectional view of an exemplary CMC aircraft engine component, such as a blade 10, of the present invention is shown. The CMC component utilizes an intermittent arrangement of uniformly coated fiber tows 2 that are coated with a composition including Boron Nitride (BN), combined with uncoated fiber tows 6. For purposes of this application, "uncoated fiber tows" means fiber tows that do not include boron nitride (BN), and therefore includes fiber tows having no coating, as well as fiber tows having a sizing or other coating that does not include BN. As illustrated in FIG. 3, and as further described herein, the benefit of utilizing uncoated fiber tows 6 is that upon curing or firing, the uncoated fiber tows 6 form a relatively strong bond between the uncoated fiber tow 6 and the interstitial ceramic matrix 4 as compared to the relatively weak bond formed between the coated fiber tows 2 and the matrix 4. The presence of uncoated fiber tows 6, and the associated presence of strong bonds, when combined with coated fiber tows 2, is expected to arrest or attenuate crack propagation, especially in regions of high interlaminar stress 20.

Figure 4:
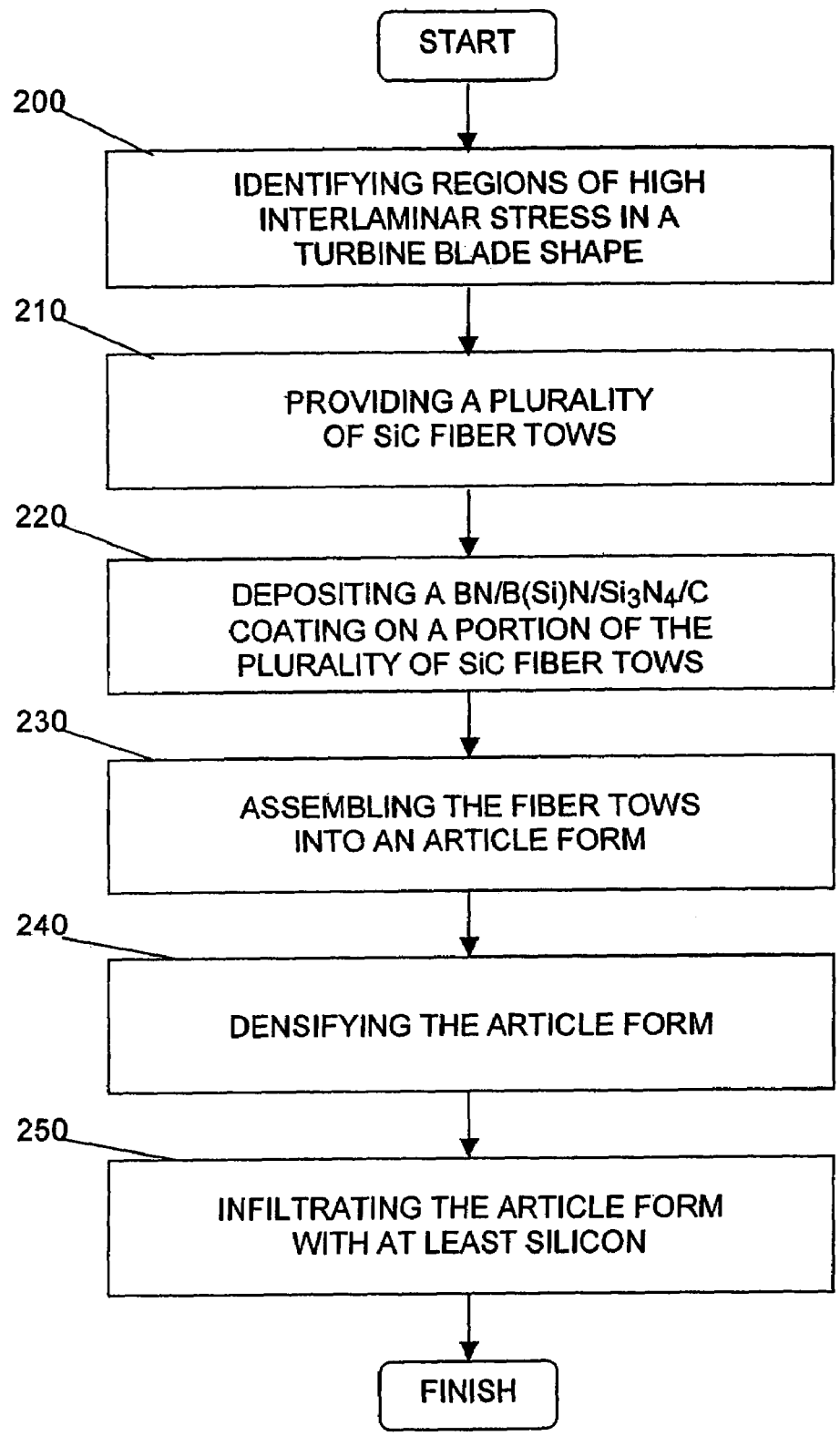
FIG. 4 is a flow chart illustrating a method of manufacture of the present invention to produce a CMC turbine blade in accordance with the present invention.

Referring now to FIG. 4, preferred steps in the fabrication of blade 10 are illustrated. In Step 200, an analysis is performed to identify regions of relatively high interlaminar stress 20. This analysis can involve instrumentation attached to a test specimen or a blade 10 constructed with conventional methods, or a computer simulation using a method such as finite element analysis to identify differing interlaminar stress regions 18, 20.

Step 210 of the present invention is providing a plurality of silicon carbide fiber tows. Such silicon carbide fiber tows are known in the art. Reference to silicon carbide fiber tows includes materials where silicon carbide envelops a core or substrate, or where silicon carbide is a core or substrate, where such materials are woven into bundles of fibers, or tows. Other core materials that can which may be enveloped by silicon carbide include carbon and tungsten. The fibrous material that comprise the fiber tows can be amorphous, crystalline, or a mixture thereof. The crystalline material may be single crystal or polycrystalline. Examples of silicon carbide-containing fibrous materials are silicon carbide, Si—C—O, Si—C—O—N, Si—C—B, and Si—C—O-Metal where the Metal component can vary, but frequently is titanium, zirconium, or boron. There are processes known in the art that use organic precursors to produce silicon carbide-containing fibers, and that can introduce a wide variety of elements into the fibers. Examples of these fibers include NICALON™, HI-NICALON™, and HI-NICALON S™, registered trademarks of Nippon Carbon Company, Ltd., Yokohama, Japan; TYRANNO™ fibers, a registered trademark of Ube Industries, Ltd., Ube City, Yamaguchi, Japan; and SYLRAMIC™ fibers, a registered trademark of Dow Coming Corporation, Midland, Mich. "Fibrous material" includes fibers, filaments, strands, bundles, whiskers, cloth, felt, and combinations thereof. The fibers are typically continuous, but can be fragmented.

The next step 220 of the process is depositing a coating on a preselected portion of the fiber tows using chemical vapor deposition (CVD) in a continuous or semi-continuous manner.

Figure 5:
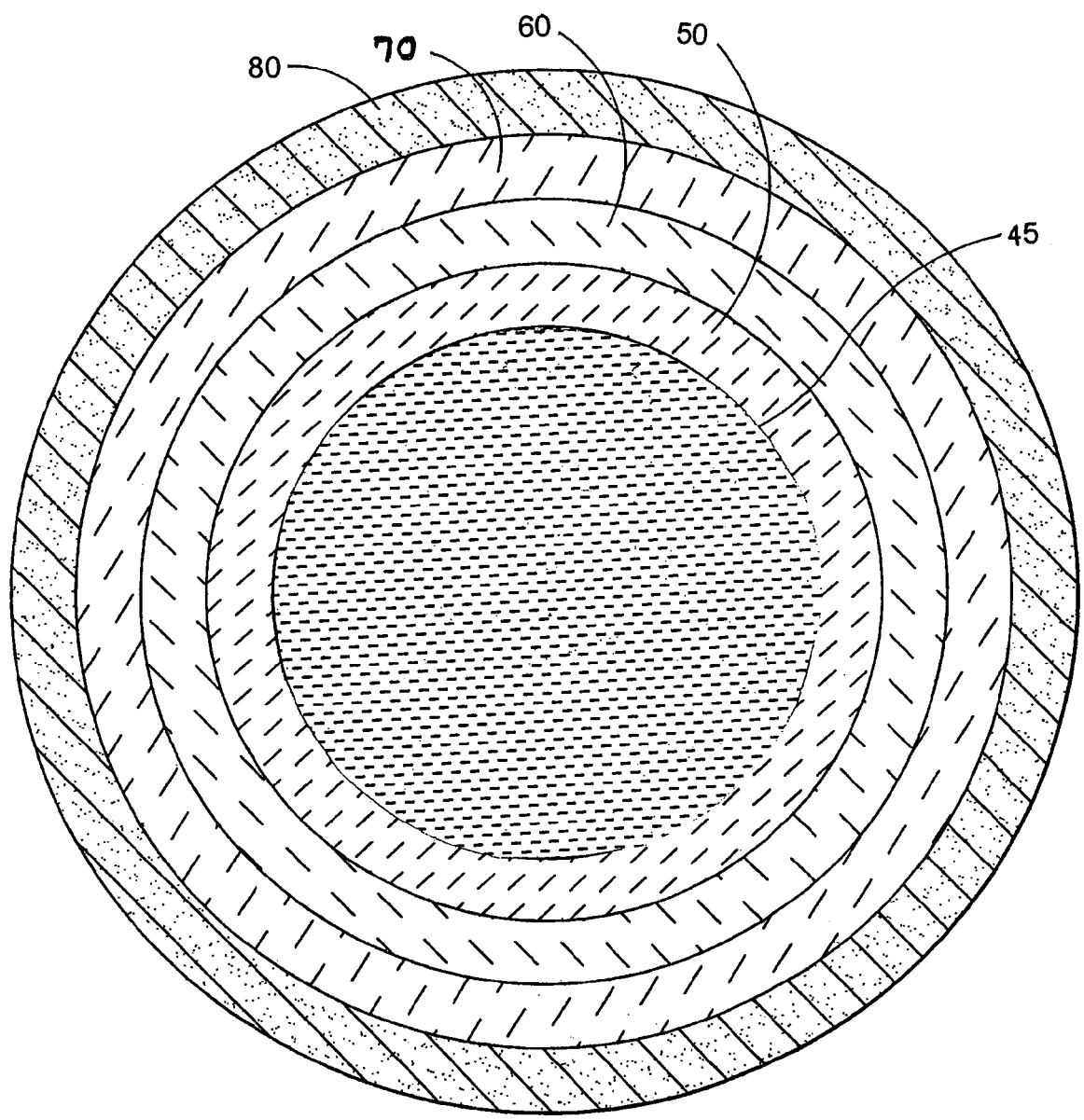
FIG. 5 is a cross-sectional view of a coated fiber tow in accordance with the present invention.

As shown in FIG. 5, which represents a single fiber within a tow, the coating on the coated fiber 45 preferably comprises four layers 50, 60, 70, 80. Each layer leaves at least no significant portion of the fibrous material exposed, and preferably, the entirety of each fiber is coated. Each layer of the coating should be substantially free of any significant porosity, and preferably is also substantially pore-free and substantially uniform. The entire coating should also be substantially free of any significant porosity and also is preferably substantially pore-free and substantially uniform. In a preferred embodiment, the coating comprises a layer 50 including BN, a layer 60 including B(Si)N overlying the layer 50, a layer 70 including $Si_3N_4$ overlying the layer 60, and a layer 80 including carbon overlying the layer 70. The layer 50 including BN is preferably about 0.25 µm to about 0.75 µm thick. The layer 50 including BN is more preferably about 0.4 µm to about 0.6 µm thick. B(Si)N coatings are described in detail in U.S. Pat. No. 5,952,100, which is assigned to the assignee of the present invention, and which is incorporated herein by reference in its entirety. In the present invention, a range of silicon weight percent in the B(Si)N including layer 60 is about 5 weight percent silicon to about 40 weight percent silicon. In a preferred embodiment, the range of silicon weight percent in the B(Si)N including layer 60 is about 5 weight percent silicon to about 25 weight percent silicon. In a more preferred embodiment, the range of silicon weight percent in the B(Si)N including layer 60 is about 11 weight percent silicon to about 19 weight percent silicon. The layer 60 including B(Si)N is preferably about 0.25 µm to about 0.75 µm thick. The layer 60 including B(Si)N is more preferably about 0.4 µm to about 0.6 µm thick. The layer 70 including $Si_3N_4$ 70 is preferably about 0.75 µm thick to about 1.25 µm thick. The layer 70 is more preferably about 0.9 µm thick to about 1.1 µm thick. The layer including carbon 80 is preferably about 0.05 µm to about 3 µm thick. The layer 80 is more preferably about 0.1 µm to about 0.2 µm thick. The layer 80 is preferably deposited as pyrolitic carbon.

Each layer 50, 60, 70, 80 of the coating is present for a different purpose and to perform a different function. For example, using pure BN in layer 50 gives good fiber-matrix debonding characteristics for a CMC, but the oxidation/volatilization resistance is poor. The layer including B(Si)N, which can be pure B(Si)N or alternatively comprise a mixture of BN and $Si_3N_4$, provides better oxidation/volitization resistance than BN alone, while still retaining fair debonding characteristics and protecting underlying fiber and coating from molten silicon during the final densification process. The layer 70 that includes $Si_3N_4$ provides even better oxidation/volitization resistance than the B(Si)N layer, but has poor debonding characteristics. However, since the BN including layer 50 is the base layer of the coating, the SiC fiber tows are still able to adequately debond from the matrix under stress. The top carbon-including layer 80 is wettable with silicon, so that upon infiltration with at least silicon, the carbon-including layer will react to form SiC, which creates a good bond between the coated fiber tows 2 and the matrix material 4. The coating of the present invention therefore has different layers 50, 60, 70, 80 that provide a different mix of desirable characteristics for the coating, so that overall the coating is silicon wettable, has good debonding characteristics, and has good oxidization/volitization resistance. Depositing fiber coatings onto tows, as opposed to depositing fiber coatings onto an entire article, as is the case with slurry cast MI, also allows higher fiber coating deposition temperatures, resulting in a more thermally stable coating due to increased crystallinity in the coating and increased coating density.

As used herein, "carbon" includes all forms of elemental carbon including graphite, particles, flakes, whiskers, or fibers of amorphous, single crystal, or polycrystalline carbon, carbonized plant fibers, lamp black, finely divided coal, charcoal, and carbonized polymer fibers or felt such as rayon, polyacrylonitrile, and polyacetylene.

Each layer of the coating is deposited using a relatively high-temperature continuous or semi-continuous process, rather than a lower temperature batch process. For example, in a preferred embodiment, each layer of the coating is deposited at a temperature in the range of about 1400° C. (2550° F.) to about 1500° C. (2730° F.). For each layer of the coating, the fiber tow is drawn through a chemical vapor deposition ("CVD") reactor and each layer of the coating is separately deposited continuously onto each SiC fiber tow as it passes through the CVD reactor. Exemplary CVD processes are disclosed and described in commonly owned U.S. patent application Ser. No. 10/952,193, which is incorporated herein by reference. Preferably, the residence time for each coating layer is in the range of about 40 seconds to about 60 seconds. In this preferred embodiment, about 125 m of tow can be coated in about 2.5 hours. The coating process may be entirely continuous, such that immediately after deposition of one layer, another layer is deposited, such that the tow passes from one section of a CVD reactor to a second section of the CVD reactor, or alternatively passed back through the same section in the case of a semi-continuous operation. The coating process may be stepwise continuous, such that the tows are drawn off of a reel and through a CVD reactor for each layer and then placed on another reel to be run back through the same or a different CVD reactor for the next coating layer. Since each individual tow, more specifically each individual fiber within each tow, is coated with the four layer coating of the present invention by running the tows, rather than being coated after the assembly of the cloth as in the prior art slurry cast MI method, the coating on each tow is more uniform. This uniformity avoids many problems inherent in coating the entire article, such as created "canned" porosity within the tow (intra-tow porosity) and non-uniformity within and between plies, particularly as part thicknesses exceed 0.20 inches.

The next step 230 of the process is assembling the coated fiber tows provided in step 220 with the uncoated tows provided in step 210. The coated and uncoated tows may be assembled into a two-dimensional ("2D") assembly such as a hybrid ply or cloth, or prepreg tape, or into a three-dimensional ("3D") assembly form. Such assembly may be performed using any method known in the art, including, but not limited to weaving, braiding, and/or winding. Each ply of ceramic cloth should have size and shape of the layer of the article into which it will be assembled. Such shaping and sizing may be performed in any manner known in the art, such as weaving a large piece of ceramic cloth ply and then cutting the ply to the size and shape desired. The coated fiber tows 2 and uncoated fiber tows 6 are flexible enough to be woven into a cloth, rather than being limited to the unidirectional plies of the prepreg MI method. Each ply may be entirely comprised of coated tows or entirely comprised of uncoated tows.

Preferably, uncoated tows are positioned in regions of expected higher interlaminar stress 20, identified in step 200, and coated tows are positioned in regions of lower stress 18. Even more preferably, coated tows 2 and uncoated tows 6 are positioned in regions of higher stress 20. As will be appreciated, uncoated fiber tows 6 allow for a strong bond between the fibers and matrix 4 within a CMC, while coated fiber tows 2 provide a weaker bond between the fibers and matrix 4. As further described herein, the orientation of uncoated tows 6 adjacent coated tows 2 may be offset by any preselected angle, but are preferably parallel or perpendicular to one another.

As an alternate embodiment of the assembly of step 230, coated tows 2 and uncoated fiber tows 6 may be woven to form a hybrid ply, or hybrid cloth, and such hybrid plies may be located in regions of higher stress 20. One known method of weaving to produce a hybrid ply or cloth involves orienting fibers or tows at a preselected offset angle, such as about 90°, from selected adjacent fibers or tows. The resulting hybrid plies or cloths can then be laid-up and assembled alone or in combination with coated fiber tows 2 or uncoated fiber tows 6 or plies to form the desired article form.

The next step 240 of the present invention is densifying the article form using a material selected from the group consisting of ceramic particulates, ceramic precursor resins, and combinations thereof. Both ceramic particulates and ceramic precursor resins are known in the art. Any functional method of matrix densification known in the art can be used in Step 240, including but not limited to slurry casting, resin transfer molding, vacuum impregnation, and combinations thereof.

The final step 250 of the process of the present invention is infiltrating the densified article form with at least silicon to form a silicon carbide CMC article to complete the densification of the article. The article form is preferably infiltrated with boron-doped silicon. The article form is more preferably infiltrated with 5 percent boron-doped silicon by weight.

Because the tows are already coated prior to the stacking of the ceramic cloth into an article form, uniform CMC articles significantly thicker than about 0.2 inches, and up to about 1 inch thick can be made using the methods of the present invention. Articles having a thickness greater than about 1 inch may be manufactured with the method of the present invention, but densification becomes more difficult as the article thickness increases beyond about 1 inch.

It would be appreciated that, while the present invention has been described in relation to a turbine engine blade, other components that would benefit from the teachings herein may be fabricated as disclosed herein. It would also be appreciated that positioning uncoated fibers within a conventional CMC may arrest cracks that develop due to lower interlaminar properties associated with coated ceramic fibers. While the method described herein relates to positioning uncoated fibers within a perform at defined regions of higher interlaminar stress, these regions may vary as operating conditions, such as temperatures and loadings, vary. Optimization of uncoated fiber placement may involve performing multiple analyses where differing regions of higher interlaminar stresses are identified, and placement of uncoated, or hybrid cloths within the identified regions.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceramic matrix composite turbine engine component: the component comprising a region of expected high interlaminar stress and a region of expected lower interlaminar stress, the component further comprising:
   a plurality of ceramic fiber tows;
   a coating comprising a plurality of layers, the coating applied to a portion of the ceramic fiber tows to form a plurality of coated fiber tows, the plurality of coated fiber tows located in at least the region of expected low interlaminar stress;
   a plurality of uncoated tows located in at least the region of expected high interlaminar stress;
   a ceramic matrix material lying in interstitial regions between the plurality of ceramic fiber tows.

2. The ceramic matrix composite turbine engine component of claim 1, wherein the ceramic matrix material is silicon carbide.

3. The ceramic matrix composite turbine engine component of claim 1, wherein the coating comprising a plurality of layers comprises:
   a layer including BN;
   a layer including B(Si)N overlying the layer of BN;
   a layer including $Si_3N_4$ overlying the layer of B(Si)N; and
   a layer including carbon overlying the layer of $Si_3N_4$.

4. The component of claim 3, wherein the layer including BN is about 0.25 µm to about 0.75 µm thick, the layer including B(Si)N is about 0.25 µm to about 0.75 µm thick, the layer including $Si_3N_4$ is about 0.75 µm thick to about 1.25 µm thick, and the layer including carbon is about 0.05 µm to about 3 µm thick.

5. The component of claim 4, wherein the layer including BN consists of BN, the layer including B(Si)N consists of B(Si)N, and the layer including $Si_3N_4$ consists of $Si_3N_4$.

6. The component of claim 4, wherein the layer including B(Si)N is comprised of about 5 weight percent silicon to about 40 weight percent silicon.

7. The component of claim 4, wherein the layer including B(Si)N is comprised of about 5 weight percent silicon to about 25 weight percent silicon.

8. The component of claim 4, wherein the layer including B(Si)N is comprised of about 11 weight percent silicon to about 19 weight percent silicon.

9. The component of claim 4, wherein the layer including carbon is deposited as pyrolitic carbon.

10. The ceramic matrix composite turbine engine component of claim 1, wherein the component is less than about 30 percent fiber by volume.

11. The ceramic matrix composite turbine engine component of claim 1, wherein the coating is at least 1.0 µm thick.

12. The ceramic matrix composite turbine engine component of claim 1, wherein the coated tows are oriented at an offset of about 90° to the uncoated tows.

* * * * *